US009860931B2

(12) United States Patent
Yang

(10) Patent No.: US 9,860,931 B2
(45) Date of Patent: Jan. 2, 2018

(54) METHOD, SYSTEM AND TERMINAL FOR REALIZING NETWORK ACCESS VIA WI-FI®

(71) Applicant: ZTE CORPORATION, Shenzhen, Guangdong Province (CN)

(72) Inventor: Jiangzi Yang, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/110,102

(22) PCT Filed: Jun. 9, 2014

(86) PCT No.: PCT/CN2014/079450
§ 371 (c)(1),
(2) Date: Jul. 7, 2016

(87) PCT Pub. No.: WO2015/103848
PCT Pub. Date: Jul. 16, 2015

(65) Prior Publication Data
US 2016/0338123 A1  Nov. 17, 2016

(30) Foreign Application Priority Data
Jan. 13, 2014 (CN) .......................... 2014 1 0027065

(51) Int. Cl.
*H04W 76/02* (2009.01)
*H04W 48/18* (2009.01)
(Continued)

(52) U.S. Cl.
CPC ......... *H04W 76/023* (2013.01); *H04W 48/16* (2013.01); *H04W 48/18* (2013.01); *H04W 84/12* (2013.01); *H04W 88/04* (2013.01)

(58) Field of Classification Search
CPC ... H04W 76/023; H04W 48/16; H04W 48/18; H04W 84/12; H04W 88/04
See application file for complete search history.

(56) References Cited

U.S. PATENT DOCUMENTS 9,019,878 B2 * 4/2015 Anders, Jr. ......... H04W 76/023
370/311
2011/0110521 A1  5/2011 Yang et al.
(Continued)

FOREIGN PATENT DOCUMENTS

CN         102076107 A     5/2011
CN         202759593 U     2/2013
(Continued)

OTHER PUBLICATIONS

Sato, Kensuke "How to Enable Wi-Fi Direct on Android 4.2, Pandaboard ES?", e2e.ti.com, Comment Posted Mar. 4, 2013 8:02AM http://e2e.ti.com/supportwireless_connectivity/wilink_wifi_bluetooth/f/307/t/249179, accessed Mar. 1, 2017, p. 2.*

*Primary Examiner* — Luat Phung
*Assistant Examiner* — Thomas R Cairns
(74) *Attorney, Agent, or Firm* — Ling Wu; Stephen Yang; Ling and Yang Intellectual Property

(57) ABSTRACT

A method, a system and a terminal for realizing network access via Wi-Fi®, the method includes: both an access terminal and an intermediate terminal enabling a Wi-Fi® Station mode and a Wi-Fi Direct® mode thereof respectively, when receiving an extended data frame, the intermediate terminal extracting valid data for accessing the network, carrying the valid data in an extended Wi-Fi® frame and sending it to a wireless router; the wireless router parsing the extended Wi-Fi® frame, sending the valid data to the network, obtaining response data and carrying it in an extended Wi-Fi® response frame, and feeding back the extended Wi-Fi® response frame to the intermediate termi-
(Continued)

nal; and after constructing the extended Wi-Fi® response frame as an extended response data frame, the intermediate terminal feeding back the extended response data frame to the access terminal, and the access terminal parsing the extended response data frame to complete network access.

4 Claims, 7 Drawing Sheets

(51) Int. Cl.
*H04W 48/16* (2009.01)
*H04W 88/04* (2009.01)
*H04W 84/12* (2009.01)

(56) References Cited

U.S. PATENT DOCUMENTS

2011/0122835 A1* 5/2011 Naito .................. H04W 76/023
                                                    370/329
2012/0320886 A1   12/2012 Anders, Jr. et al.

FOREIGN PATENT DOCUMENTS

| CN | 103501527 A | 1/2014 |
| WO | WO2013052078 A1 | 4/2013 |

* cited by examiner

METHOD, SYSTEM AND TERMINAL FOR REALIZING NETWORK ACCESS VIA WI-FI®

TECHNICAL FIELD

The present document relates to the technical field of realizing network access via Wi-Fi®(Wireless fidelity), in particular to a method, a system, an access terminal, an intermediate terminal and a terminal for realizing network access via Wi-Fi®.

BACKGROUND OF THE RELATED ART

With the progress of the science and technology and the development of the society, more and more electronic products come into the life of ordinary people. As typical examples of newly emerging electronic products, mobile terminals such as smart phones, tablet computers and electronic readers are concerned and welcomed by more and more people.

Wi-Fi® technology is a brand of wireless network communication technology based on IEEE 802.11 series standards, aims at improving intercommunity between mobile terminals in wireless networks based on the IEEE 802.11 standards. Wi-Fi® technology is a wireless local area network technology based on the IEEE 802.11 standards. Wi-Fi® has already become one of the most important functions in mobile terminal systems.

Referring to Wi-Fi® technical standards, as a Wi-Fi® terminal for accessing a network via Wi-Fi®, a mobile terminal generally supports three working modes, i.e., Wi-Fi® Station, Wi-Fi® Hotspot and Wi-Fi Direct®, herein the Wi-Fi® Station mode is the most basic mode for terminal networking and is a mode in which a client is connected with a wireless router network to realize network access in the entire local area network; the Wi-Fi® Hotspot mode is a working mode in which the Wi-Fi® terminal is used as a server in the local area network, and the Wi-Fi® terminal in the Wi-Fi® Hotspot mode is a terminal which plays a role of a wireless router in the network to provide network access for other Wi-Fi® terminals; and Wi-Fi Direct® is a new standard which was put forward in recent years and allow the Wi-Fi® terminal to directly realize connection between terminals and transmission of data information without via the wireless router. In the Wi-Fi Direct® working mode, both connected parties form a group through negotiation, one party is a Group Owner (GO) and the other party is a Group Customer (GC).

Wi-Fi® protocols therein contain three main types of frames, data frame, control frame and management frame, herein the data frame is just like a pack horse of the Wi-Fi® protocols and is used for taking the responsibility for transmitting data between workstations. Since network environments are different, data frames may be different. The control frame is generally used for being cooperatively used with the data frame, taking the responsibility for clearing regions, gaining channels and maintenance of carrier sensing, and making a positive response after data are received, so as to improve the reliability of data transmission between the workstations. The management frame is used for taking the responsibility for joining in or exiting the wireless network and supervising the process of transfer affairs of connection between base stations.

In the current Wi-Fi® networking mode, when the Wi-Fi® terminal in the Wi-Fi® Station mode is within a signal coverage range of the wireless router, connection may be realized through correct authentication passwords. However, in the local area network, the wireless router has a limitation to the number of the Wi-Fi® terminals which are connected thereto. In other words, when Wi-Fi® terminals are connected to the wireless router, if the Wi-Fi® terminals connected to the wireless router are too many, as a result some Wi-Fi® terminals will be unable to join in a local area network via the wireless router to access the network.

SUMMARY

The technical problem to be solved by the embodiment of the present document is to provide a method, a system and a terminal for realizing network access via Wi-Fi®, so as to avoid the occurrence of the situation that a Wi-Fi® terminal cannot join in a local area network to access a network via a wireless router, thereby improving the validity of network access.

In order to solve the above-mentioned technical problem, the following technical solution is adopted:

A method for realizing network access via Wi-Fi® includes:

both an access terminal and an intermediate terminal enabling a Wi-Fi® Station mode and a Wi-Fi Direct® mode of themselves respectively, and when receiving an extended data frame used for representing that the access terminal accesses a network, the intermediate terminal extracting valid data for accessing the network;

the intermediate terminal carrying the valid data extracted in an extended Wi-Fi® frame and sending the extended Wi-Fi® frame to a wireless router;

the wireless router parsing the extended Wi-Fi® frame, sending the valid data obtained through parsing to the network, and obtaining response data from the network;

the wireless router carrying the response data obtained in an extended Wi-Fi® response frame, and feeding back the extended Wi-Fi® response frame to the intermediate terminal; and after constructing the extended Wi-Fi® response frame as an extended response data frame, the intermediate terminal feeding back the extended response data frame to the access terminal, and the access terminal parsing the extended response data frame to complete network access.

Alternatively, before the step of both the access terminal and the intermediate terminal enabling the Wi-Fi® Station mode and the Wi-Fi Direct® mode of themselves respectively, the method further includes:

when sending a network access command CMD_ONLINE and indicating that the network cannot be accessed, the access terminal constructing an extended data frame to distinguish from a data frame which is directly interacted between the access terminal and the intermediate terminal, and sending the valid data for accessing the network to the intermediate terminal;

herein the extended data frame is featured by that an attribute of an item 0xbc in a Framebody is 0x01; and the valid data are data Sub and CMD_ONLINE, and other bits except the data Sub and CMD_ONLINE are filled according to a Wi-Fi Direct® standard format.

Alternatively, the step of the intermediate terminal carrying the valid data extracted in an extended Wi-Fi® frame includes:

the intermediate terminal constructs an extended Wi-Fi® frame; in the extended Wi-Fi® frame, a Type value of a frame type in Frame Control is 11, a data type Subtype is first four bits of the valid data, a Framebody is remaining data of the valid data, and other data except the Frame Control, the data type Subtype and the Framebody are filled according to protocols.

A system for realizing network access via Wi-Fi® includes a wireless router, at least one access terminal and at least one intermediate terminal, both the access terminal and the intermediate terminal being in a Wi-Fi® Station mode and a Wi-Fi Direct® mode; herein, the access terminal is configured to send an extended data frame to the intermediate terminal; and receive an extended response data frame sent by the intermediate terminal and parse the extended response data frame;

the intermediate terminal is configured to, when receiving the extended data frame used for representing that the access terminal accesses a network, extract valid data for accessing the network; carry the valid data extracted in an extended Wi-Fi® frame and send the extended Wi-Fi® frame to the wireless router; and after constructing an extended Wi-Fi® response frame as the extended response data frame, feed back the extended response data frame to the access terminal; and the wireless router is configured to parse the extended Wi-Fi® frame, send the valid data obtained through parsing to the network and obtain response data from the network; and carry the response data obtained in the extended Wi-Fi® response frame and feed back the extended Wi-Fi® response frame to the intermediate terminal.

Alternatively, the access terminal is further configured to, when sending a network access command CMD_ONLINE and indicating that the network cannot be accessed, construct the extended data frame;

herein the extended data frame is featured by that an attribute of an item 0xbc in a Framebody is 0x01; and the valid data are data Sub and CMD_ONLINE, and other bits except the data Sub and CMD_ONLINE are filled according to a Wi-Fi Direct® standard format.

Alternatively, the intermediate terminal is configured to carry the valid data extracted in the extended Wi-Fi® frame according to a method as follow:

the intermediate terminal constructs an extended Wi-Fi® frame; in the extended Wi-Fi® frame, a TYPE value of a frame type in Frame Control is 11, a data type Subtype is first four bits of the valid data, a Framebody is remaining data of the valid data, and other data except the Frame Control, the data type Subtype and the Framebody are filled according to protocols.

A terminal for realizing network access via Wi-Fi® includes a packaging unit, a sending unit and a receiving unit; herein, the packaging unit is configured to, when sending a network access command CMD_ONLINE and indicating that a network cannot be accessed, construct an extended data frame containing valid data for accessing the network;

the sending unit is configured to send the extended data frame to an intermediate terminal via a P2P0 interface; and the receiving unit is configured to receive response data fed back by the intermediate terminal when the network is accessed according to the valid data of the extended data frame.

Alternatively, the receiving unit is further configured to receive the extended data frame which contains the valid data for accessing the network and is constructed by an access terminal when sending the network access command CMD_ONLINE and being unable to access the network; and receive an extended Wi-Fi® response frame sent by a wireless router;

the packaging unit is configured to parse the extended data frame and obtain the valid information for accessing the network through parsing; construct an extended Wi-Fi® frame and fill the valid information into the extended Wi-Fi® frame; and construct an extended response data frame and fill the extended Wi-Fi® response frame into the extended response data frame; and the sending unit is further configured to send the extended Wi-Fi® frame constructed by the packaging unit to the wireless router; and send the extended response data frame generated by the packaging unit to the access terminal.

Alternatively, the packaging unit is configured to, when sending CMD_ONLINE and indicating that the network cannot be accessed, construct the extended data frame which is featured by that an attribute of an item 0xbc in a Framebody is 0x01, the valid data are data Sub and CMD_ONLINE, and other bits are filled according to a Wi-Fi Direct® standard format.

Alternatively, the packaging unit is configured to:

construct a data frame which is featured by that a TYPE value of a frame type in frame control is 11, a data type Subtype is first four bits of the valid data, a Framebody is remaining data of the valid data, and other data except the Frame Control, the data type Subtype and the Framebody are filled according to protocols; and construct an extended response data frame according to a method of packaging the extended data frame.

A terminal for realizing network access via Wi-Fi® includes a receiving unit, a packaging unit and a sending unit, herein, the receiving unit is configured to receive an extended data frame which contains valid data for accessing a network and is constructed by an access terminal when sending a network access command CMD_ONLINE and indicating that the network cannot be accessed; and receive an extended Wi-Fi® response frame sent by a wireless router;

the packaging unit is configured to parse the extended data frame and obtain the valid information for accessing the network through parsing; construct an extended Wi-Fi® frame and fill the valid information into the extended Wi-Fi® frame; and construct an extended response data frame and fill the extended Wi-Fi® response frame into the extended response data frame; and the sending unit is configured to send the extended Wi-Fi® frame constructed by the packaging unit to the wireless router; and send the extended response data frame generated by the packaging unit to the access terminal.

In the above-mentioned technical solution, both the access terminal and the intermediate terminal enable the Wi-Fi® Station mode and the Wi-Fi Direct® mode of themselves respectively, and when receiving the extended data frame used for representing that the access terminal accesses the network, the intermediate terminal extracts the valid data for accessing the network, carries the valid data in the extended Wi-Fi® frame and sending the extended Wi-Fi® frame to the wireless router; the wireless router parses the extended Wi-Fi® frame, sends the valid data to the network, obtains the response data and carries the response data in the extended Wi-Fi® response frame, and feeds back the extended Wi-Fi® response frame to the intermediate terminal; and after constructing the extended Wi-Fi® response frame as the extended response data frame, the intermediate terminal feeds back the extended response data frame back to the access terminal, and the access terminal parses the extended response data frame to complete network access. In the embodiments of the present document, by constructing the extended Wi-Fi® frame and the extended data frame, data of the access terminal which is unable to access the Wi-Fi® network are sent to the wireless router through the intermediate terminal, the occurrence of the situation that the Wi-Fi® terminal cannot join in a local area network to access the network via the wireless router is avoided, thereby improving the validity of network access.

BRIEF DESCRIPTION OF DRAWINGS

The drawings to be described here are used for providing further understanding about the embodiments of the present document and form a part of the present application. Exemplary embodiments of the present document and description thereof are used for explaining the present document and do not constitute any improper limitation to the present document. In the drawings.

PREFERRED EMBODIMENTS

Figure 1:
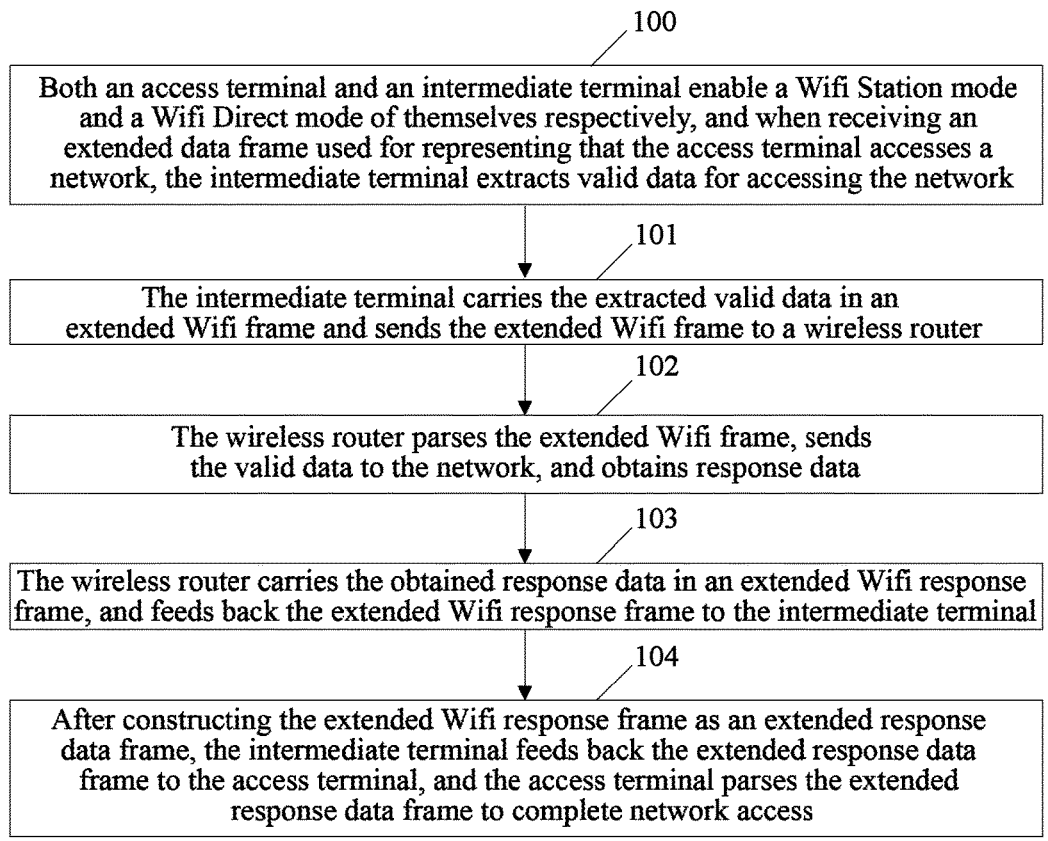
FIG. 1 is a flowchart of a method for realizing network access via Wi-Fi® provided by the embodiment of the present document.

The specific embodiments of the present document will be described below in detail in combination with the drawings.

The embodiment of the present document provides a method for realizing network access via Wi-Fi®, which includes:

both an access terminal and an intermediate terminal enable a Wi-Fi® Station mode and a Wi-Fi Direct® mode of themselves respectively, and when receiving an extended data frame used for representing that the access terminal accesses a network, the intermediate terminal extracts valid data for accessing the network;

the intermediate terminal carries the extracted valid data in an extended Wi-Fi® frame and sends the extended Wi-Fi® frame to a wireless router;

the wireless router parses the extended Wi-Fi® frame, sends the valid data obtained through parsing to the network, and obtains response data;

the wireless router carries the obtained response data in an extended Wi-Fi® response frame, and feeds back the extended Wi-Fi® response frame to the intermediate terminal; and after constructing the extended Wi-Fi® response frame as an extended response data frame, the intermediate terminal feeds back the extended response data frame to the access terminal, and the access terminal parses the extended response data frame to complete network access.

Alternatively, before the method, the following step is further included: when sending a network access command CMD_ONLINE and being unable to access the network, the access terminal constructs the extended data frame to distinguish from a data frame which is directly interacted between the access terminal and the intermediate terminal, and sends the valid data for accessing the network to the intermediate terminal;

herein the extended data frame is featured by that an attribute of an item 0xbc in a Framebody is 0x01, the valid data are data Sub and CMD_ONLINE, and other bits are filled according to a Wi-Fi Direct® standard format.

Alternatively, the intermediate terminal carrying the extracted valid data in the extended Wi-Fi® frame includes: the intermediate terminal constructs an extended Wi-Fi® frame, herein the extended Wi-Fi® frame is a Wi-Fi® frame which is feathered by that a TYPE value of a frame type in Frame Control is 11, a data type Subtype is first four bits of the valid data, a Framebody is remaining data of the valid data, and other data are filled according to protocols.

In another aspect, the embodiment of the present application further provides a system for realizing network access via Wi-Fi®, which includes at least one access terminal, at least one intermediate terminal and a wireless router; herein the access terminal and the intermediate terminal are configured in a Wi-Fi® Station mode and a Wi-Fi Direct® mode, herein, the access terminal is configured to send an extended data frame to the intermediate terminal; and receive an extended response data frame sent by the intermediate terminal and parse the extended response data frame;

the intermediate terminal is configured to, when receiving the extended data frame used for representing that the access terminal accesses a network, extract valid data for accessing the network; carry the extracted valid data in an extended Wi-Fi® frame and send the extended Wi-Fi® frame to the wireless router; and after constructing an extended Wi-Fi® response frame as the extended response data frame, feed back the extended response data frame to the access terminal; and the wireless router is configured to parse the extended Wi-Fi® frame, send the valid data obtained through parsing to the network and obtain response data; and carry the obtained response data in the extended Wi-Fi® response frame and feed back the extended Wi-Fi® response frame to the intermediate terminal.

Alternatively, the access terminal is further configured to, when sending a network access command CMD_ONLINE and being unable to access the network, construct the extended data frame;

herein the extended data frame is featured by that an attribute of an item 0xbc in a Framebody is 0x01, the valid data are data Sub and CMD_ONLINE, and other bits are filled according to a Wi-Fi Direct® standard format.

Alternatively, carrying the extracted valid data in the extended Wi-Fi® frame includes:

the intermediate terminal constructs an extended Wi-Fi® frame; herein the extended Wi-Fi® frame is a Wi-Fi® frame which is featured by that a TYPE value of a frame type in Frame Control is 11, a data type Subtype is first four bits of the valid data, a Framebody is remaining data of the valid data, and other data are filled according to protocols.

In another aspect, the embodiment of the present application further provides an access terminal for realizing network access via Wi-Fi®, which includes a packaging unit, a sending unit and a receiving unit, herein, the packaging unit is configured to, when sending a network access command CMD_ONLINE and being unable to access a network, construct an extended data frame containing valid data for accessing the network;

the sending unit is configured to send the extended data frame to an intermediate terminal via a P2P0 interface; and the receiving unit is configured to receive response data fed back by the intermediate terminal when the network is accessed according to the valid data of the extended data frame.

In another aspect, the embodiment of the present application further provides an intermediate terminal for realizing network access via Wi-Fi®, which includes a first unit, a construction unit and a second unit; herein, the first unit is configured to receive an extended data frame which contains valid data for accessing a network and is constructed by an access terminal when sending a network access command CMD_ONLINE and being unable to access the network, parse the extended data frame, and obtain valid information for accessing the network;

the construction unit is configured to construct an extended Wi-Fi® frame to be received by a wireless router and fill the valid information obtained by the first unit into a corresponding position of the extended Wi-Fi® frame; and construct an extended response data frame and fill an extended Wi-Fi® response frame of network access feedback sent by the wireless router into the extended response data frame; and the second unit is configured to send the extended response data frame generated by the construction unit to the access terminal to complete network access.

In another aspect, the embodiment of the present application further provides a terminal for realizing network access via Wi-Fi®, which includes a packaging unit, a sending unit, a receiving unit, a first unit, a construction unit and a second unit; herein, the packaging unit is configured to, when sending a network access command CMD_ONLINE and being unable to access a network, construct an extended data frame containing valid data for accessing the network;

the sending unit is configured to send the extended data frame to an intermediate terminal via a P2P0 interface;

the receiving unit is configured to receive response data fed back by the intermediate terminal when the network is accessed according to the valid data of the extended data frame;

the first unit is configured to receive the extended data frame which contains the valid data for accessing the network and is constructed by an access terminal when sending CMD_ONLINE and being unable to access the network, parse the extended data frame, and obtain valid information for accessing the network;

the construction unit is configured to construct an extended Wi-Fi® frame to be received by a wireless router and fill the valid information obtained by the first unit into a corresponding position of the extended Wi-Fi® frame; and construct an extended response data frame and fill an extended Wi-Fi® response frame of network access feedback sent by the wireless router into the extended response data frame; and the second unit is configured to send the extended response data frame generated by the construction unit to the access terminal to complete network access.

Alternatively, the packaging unit is configured to, when sending the network access command CMD_ONLINE and being unable to access the network, construct the extended data frame which is featured by that an attribute of an item 0xbc in a Framebody is 0x01, the valid data are data Sub and CMD_ONLINE, and other bits are filled according to a Wi-Fi Direct® standard format.

Alternatively, the construction unit is configured to:

construct a data frame which is featured by that a TYPE value of a frame type in Frame Control is 11, a data type Subtype is first four bits of the valid data, a Framebody is remaining data of the valid data, and other data are filled according to protocols; and construct the extended response data frame according to a method of packaging the extended data frame.

FIG. 1 is a flowchart of a method for realizing addition of available ports of a terminal provided by the embodiment of the present document. As shown in FIG. 1, the method includes:

In step 100, both an access terminal and an intermediate terminal enable a Wi-Fi® Station mode and a Wi-Fi Direct® mode of themselves respectively, and when receiving an extended data frame used for representing that the access terminal accesses a network, the intermediate terminal extracts valid data for accessing the network.

A Wi-Fi® device generally supports three working modes, i.e., Wi-Fi® Station mode, Wi-Fi® AP mode and Wi-Fi Direct® mode, herein the Wi-Fi® Station mode is a mode in which a device is used as a workstation and connected with a router via Wi-Fi® to access the network, and commonly used Wi-Fi® network access function works in this mode; the Wi-Fi® AP mode is a mode in which the device is used as an access point (hotspot) to provide a wireless network for other devices, and a mobile phone is used as a hotspot in this mode; and the Wi-Fi Direct® mode is similar to Bluetooth and allows two mobile terminals in the Wi-Fi Direct® mode to connect with each other to complete operations such as file transmission. It is supported that the Wi-Fi® Station mode and the Wi-Fi Direct® mode are coexistent.

In addition, when the access terminal normally accesses the network via Wi-Fi®, the access terminal may send request/response/interaction data and the like to the wireless router, these data are valid data in the above-mentioned steps, and these data are fully packaged in a Wi-Fi Direct® extended frame.

It needs to be stated that, access terminals in networks refer to partial terminals, network access commands of which cannot be received because the partial terminals cannot directly connect to wireless routers or the number of terminals capably connected to the wireless routers has already reached an upper limit when the partial terminals send the network access commands. Intermediate terminals refer to terminals which can communicate with the access terminals in the Wi-Fi Direct® mode and can communicate with the wireless routers in the Wi-Fi® Station mode to access networks. In order to distinguish interactive communication between the access terminal and the intermediate terminal from the communication in the purpose of realizing network access of the access terminal by virtue of the intermediate terminal, the effect of distinguishing from the data frame of interaction communication needs to be realized through the extended data frame, so as to perform corresponding processing in data communication processes.

In step 101, the intermediate terminal carries the extracted valid data in an extended Wi-Fi® frame and sends the extended Wi-Fi® frame to a wireless router.

This step further includes that the intermediate terminal constructs an extended Wi-Fi® frame and correspondingly fills the valid data in the extended Wi-Fi® frame according to a method as follow: the intermediate terminal constructs an extended Wi-Fi® frame; herein a TYPE value of a frame type is 11, a data type (Subtype) is first four bits of the valid data, a Framebody is remaining data of the valid data, and other data except the frame type, the data type and the Framebody are filled according to protocols. The first four bits of the valid data are consistent with the Subtype bits of the extended frame, and the remaining data of the valid data refer to all data except the first four bits of the valid data.

It needs to be stated that, in related arts, the TYPE value of the frame type in Frame Control includes 00, 01 and 10 which respectively represent data frame, control frame and management frame, and TYPE 11 is a TYPE value of the frame type which was not used before, the TYPE 11 here is used to distinguish from related communication frames and effectively distinguish the extended Wi-Fi® frame from the Wi-Fi® frame of the intermediate device for accessing the network under normal situations.

In step 102, the wireless router parses the extended Wi-Fi® frame, sends the valid data to the network, and obtains response data.

In step 103, the wireless router carries the obtained response data in an extended Wi-Fi® response frame, and feeds back the extended Wi-Fi® response frame to the intermediate terminal.

In needs to be stated that a method of constructing the extended Wi-Fi® response frame is the same as the method of constructing the extended Wi-Fi® frame in step 201, i.e., the TYPE value of the frame type in Frame Control is 11. In related arts, the TYPE value of the frame type in Frame Control includes 00, 01 and 10 which respectively represent data frame, control frame and management frame, and TYPE 11 is a TYPE value of the frame type which was not used before, the TYPE 11 here is used to distinguish from related communication frames and realize effective detection of extended data frames. The data type Subtype is first four bits of the response data, the Framebody is remaining data of the response data and other data are filled into Wi-Fi® frame according to protocols.

In step 104, after constructing the extended Wi-Fi® response frame as an extended response data frame, the intermediate terminal feeds back the extended response data frame to the access terminal, and the access terminal parses the extended response data frame to complete network access.

When the access terminal needs to access the network but cannot be directly connected to the wireless router via Wi-Fi® to complete a network access operation, the access terminal sends a network access command (CMD_ONLINE) and indicating that the network cannot be accessed, constructs an extended data frame to distinguish from a data frame directly interacted between the access terminal and the intermediate terminal, and sends the valid data for accessing the network to the intermediate terminal.

The extended data frame is featured by that an attribute of an item 0xbc in a Framebody is 0x01, the valid data are data Sub and CMD_ONLINE, and other bits are filled according to a Wi-Fi Direct® standard format.

Figure 2:
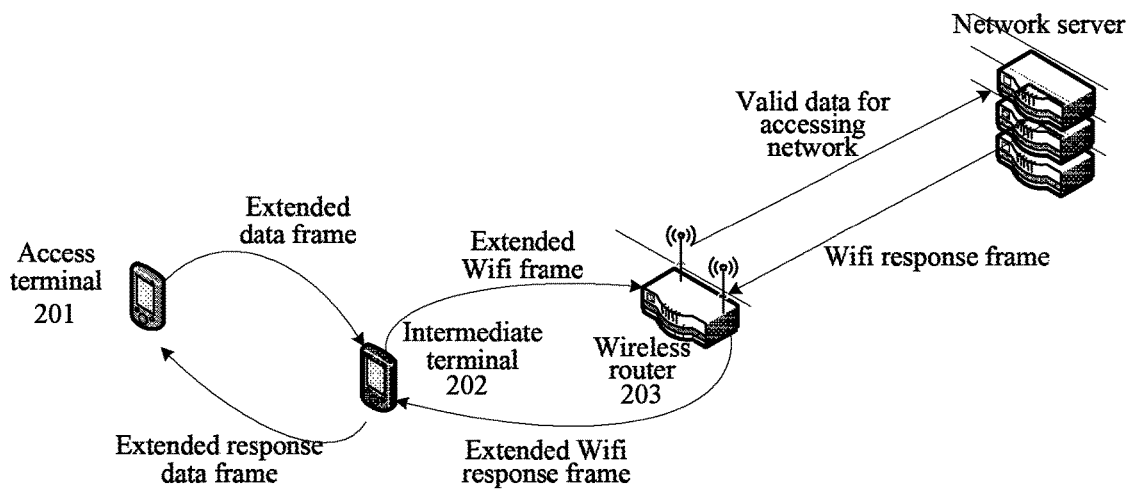
FIG. 2 is a structural diagram of a system for realizing network access via Wi-Fi® provided by the embodiment of the present document.

FIG. 2 is a structural diagram of a system for realizing network access via Wi-Fi® provided by the embodiment of the present document. As shown in FIG. 2, the system includes at least one access terminal 201, at least one intermediate terminal 202 and a wireless router 203, herein the access terminal and the intermediate terminal are configured in a Wi-Fi® Station mode and a Wi-Fi Direct® mode. Herein, the access terminal 201 is configured to send an extended data frame to the intermediate terminal; and receive an extended response data frame sent by the intermediate terminal and parse the extended response data frame;

the intermediate terminal 202 is configured to, when receiving the extended data frame used for representing that the access terminal accesses a network, extract valid data for accessing the network; carry the extracted valid data in an extended Wi-Fi® frame and send the extended Wi-Fi® frame to the wireless router; and after constructing an extended Wi-Fi® response frame as the extended response data frame, feed back the extended response data frame to the access terminal.

Carrying the extracted valid data in the extended Wi-Fi® frame includes:

the intermediate terminal constructs an extended Wi-Fi® frame, herein the extended Wi-Fi® frame is a Wi-Fi® frame which is featured by that a TYPE value of a frame type in Frame Control is 11, a Subtype is first four bits of the valid data, a Framebody is remaining data of the valid data, and other data are filled according to protocols.

The wireless router 203 is configured to parse the extended Wi-Fi® frame, send the valid data to the network and obtain response data; and carry the obtained response data in the extended Wi-Fi® response frame and send the extended Wi-Fi® response frame to the intermediate terminal.

The access terminal 201 is further configured to, when sending a network access command CMD_ONLINE and being unable to access the network, construct the extended data frame;

herein the extended data frame is featured by that an attribute of an item 0xbc in a Framebody is 0x01, the valid data are Sub and CMD_ONLINE, and other bits are filled according to a Wi-Fi Direct® standard format.

Figure 3:
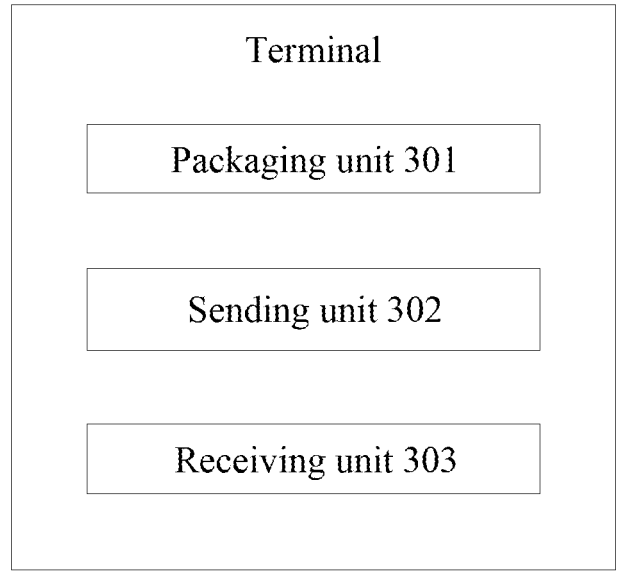
FIG. 3 is a structural schematic diagram of a terminal for realizing network access via Wi-Fi® provided by the embodiment of the present document.

The embodiment of the present document further discloses an access terminal for realizing network access via Wi-Fi®. As shown in FIG. 3, the access terminal includes a packaging unit 301, a sending unit 302 and a receiving unit 303; herein, the packaging unit 301 is configured to, when sending a network access command CMD_ONLINE and being unable to access a network, construct an extended data frame containing valid data for accessing the network;

the sending unit 302 is configured to send the extended data frame to an intermediate terminal via a P2P0 interface; and the receiving unit 303 is configured to receive response data fed back by the intermediate terminal when the network is accessed according to the valid data of the extended data frame.

Alternatively, the packaging unit 301 is configured to, when sending the network access command CMD_ONLINE and being unable to access the network, construct the extended data frame which is featured by that an attribute of an item 0xbc in a Framebody is 0x01, the valid data are Sub and CMD_ONLINE, and other bits are filled according to a Wi-Fi Direct® standard format.

Figure 4:
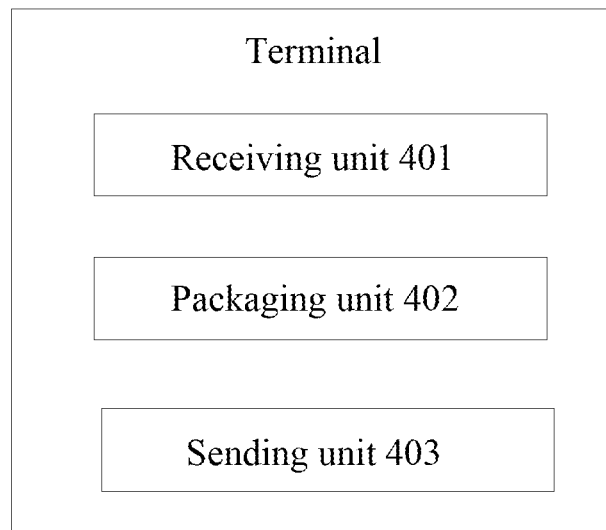
FIG. 4 is a structural schematic diagram of a terminal for realizing network access via Wi-Fi® provided by the embodiment of the present document.

The embodiment of the present document further discloses an intermediate terminal for realizing network access via Wi-Fi®. As shown in FIG. 4, the intermediate terminal includes a receiving unit 401, a packaging unit 402 and a sending unit 403; herein, the receiving unit 401 is configured to receive an extended data frame which contains valid data for accessing a network and is constructed by an access terminal when sending a network access command CMD_ONLINE and being unable to access the network;

the packaging unit 402 is configured to parse the extended data frame and obtain valid information for accessing the network; construct an extended Wi-Fi® frame to be received by a wireless router and fill the valid information obtained by the receiving unit 401 into a corresponding position of the extended Wi-Fi® frame; and construct an extended response data frame and fill an extended Wi-Fi® response frame of network access feedback sent by the wireless router into the extended response data frame; and the sending unit 403 is configured to send the extended response data frame generated by the packaging unit 402 to the access terminal to complete network access.

Alternatively, the packaging unit 402 is configured to construct a data frame which is featured by that a TYPE value of a frame type in Frame Control is 11, a data type Subtype is first four bits of the valid data, a Framebody is remaining data of the valid data, and other data are filled according to protocols; and construct the extended response data frame according to a method of packaging the extended data frame.

Figure 5:
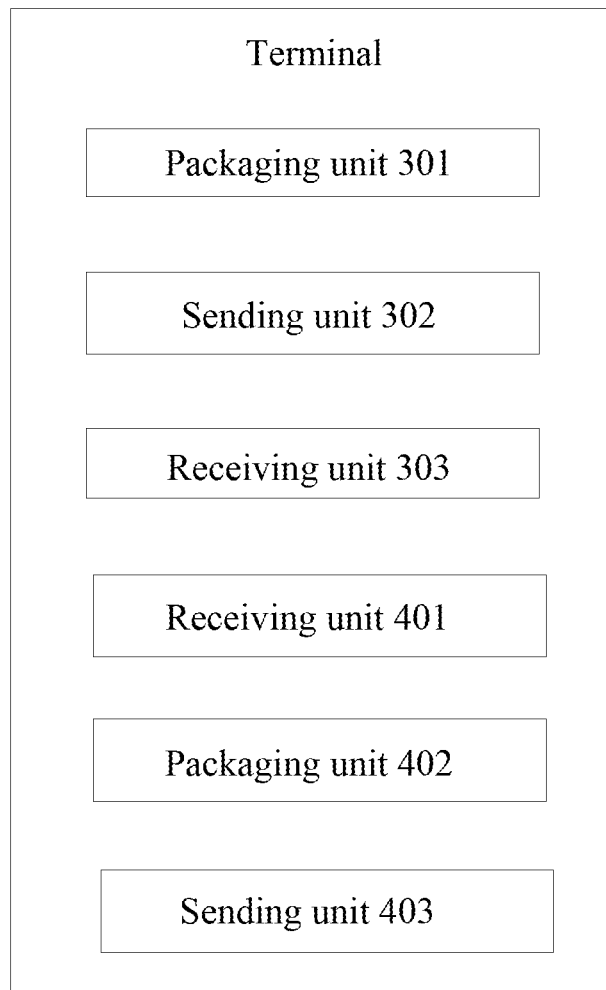
FIG. 5 is a structural schematic diagram of a terminal for realizing network access via Wi-Fi® provided by the embodiment of the present document.

The embodiment of the present document further provides a terminal for realizing network access via Wi-Fi®. As shown in FIG. 5, the terminal includes a packaging unit 301, a sending unit 302, a receiving unit 303, a receiving unit 401, a packaging unit 402 and a sending unit 403. Structures of these units are as shown in the above-mentioned two embodiments and thus are not repetitively described here.

The present document will be described below in detail in combination with the specific embodiments. It needs to be stated that the embodiments are just used for more clearly describing the contents of the present document instead of limiting the present document.

Embodiment 1

Figure 6:
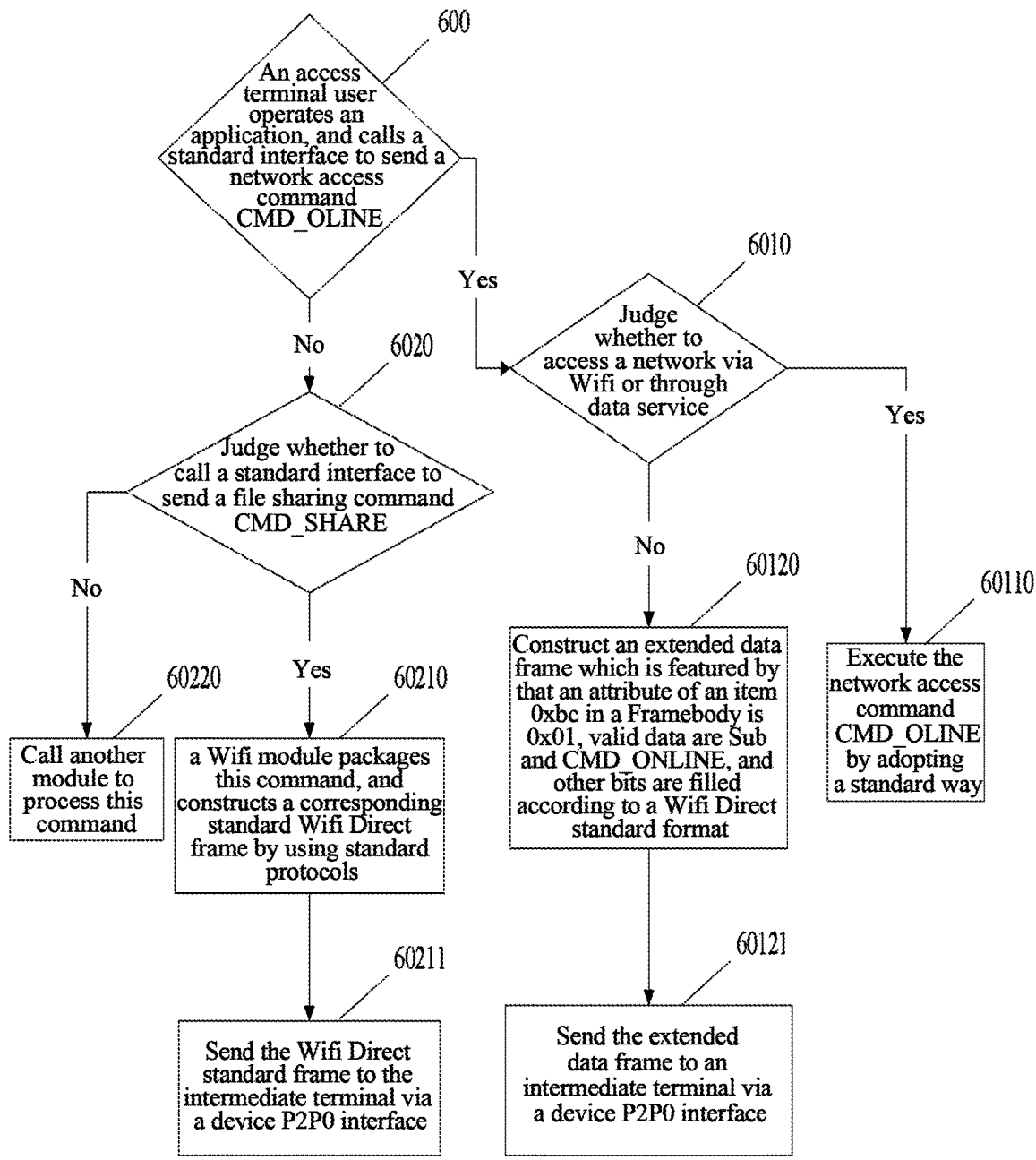
FIG. 6 is a flowchart of a method for realizing network access via Wi-Fi® provided by embodiment 1 of the present document.

FIG. 6 is a flowchart of a method for realizing network access via Wi-Fi® provided by embodiment 1 of the present document. As shown in FIG. 6, the method for realizing network access via Wi-Fi® includes:

In step 600, an access terminal user operates an application, and calls a standard interface to whether to send a network access command CMD_OLINE. If so, step 6010 is executed; and otherwise, step 6020 is executed.

In step 6010, when an access terminal sends the CMD_OLINE, the access terminal judges whether to access a network via Wi-Fi® or through data service. If so, step 60110 is executed; and otherwise, step 60120 is executed.

In step 60110, the access terminal executes the network access command CMD_OLINE by adopting a standard way.

In step 60120, the access terminal constructs an extended data frame which is featured by that an attribute of an item 0xbc in a Framebody is 0x01, valid data are Sub and CMD_ONLINE, and other bits are filled according to a Wi-Fi Direct® standard format.

In step 60121, the access terminal sends the extended data frame to an intermediate terminal via a device P2P0 interface.

In step 600, when the access terminal user operates the application and the command sent by calling the standard interface is not a network access command CMD_ONLINE, step 6020 is executed.

In step 6020, it is to judge whether a file sharing command CMD_SHARE is sent when the access terminal user operates the application to call the standard interface. If so, step 60210 is executed; and otherwise, step 60220 is executed.

In step 60210, a Wi-Fi® module of the access terminal packages this command, and constructs a corresponding standard Wi-Fi Direct® frame by using standard protocols.

In step 60211, the Wi-Fi Direct® standard frame is sent to the intermediate terminal via the device P2P0 interface.

In step 60220, if the command which the access terminal calls the standard interface to sent is neither CMD_ONLINE nor CMD_SHARE, another module is called to process this command.

It needs to be stated that the method and steps of step 6020 and after step 6020 are contents of related arts. The purposes of clearly describing the method flow are to clearly describe the protected contents of the present document and to state that the method of the present document does not cause any conflict with other communication processes of the methods of the related arts.

Embodiment 2

Figure 7:
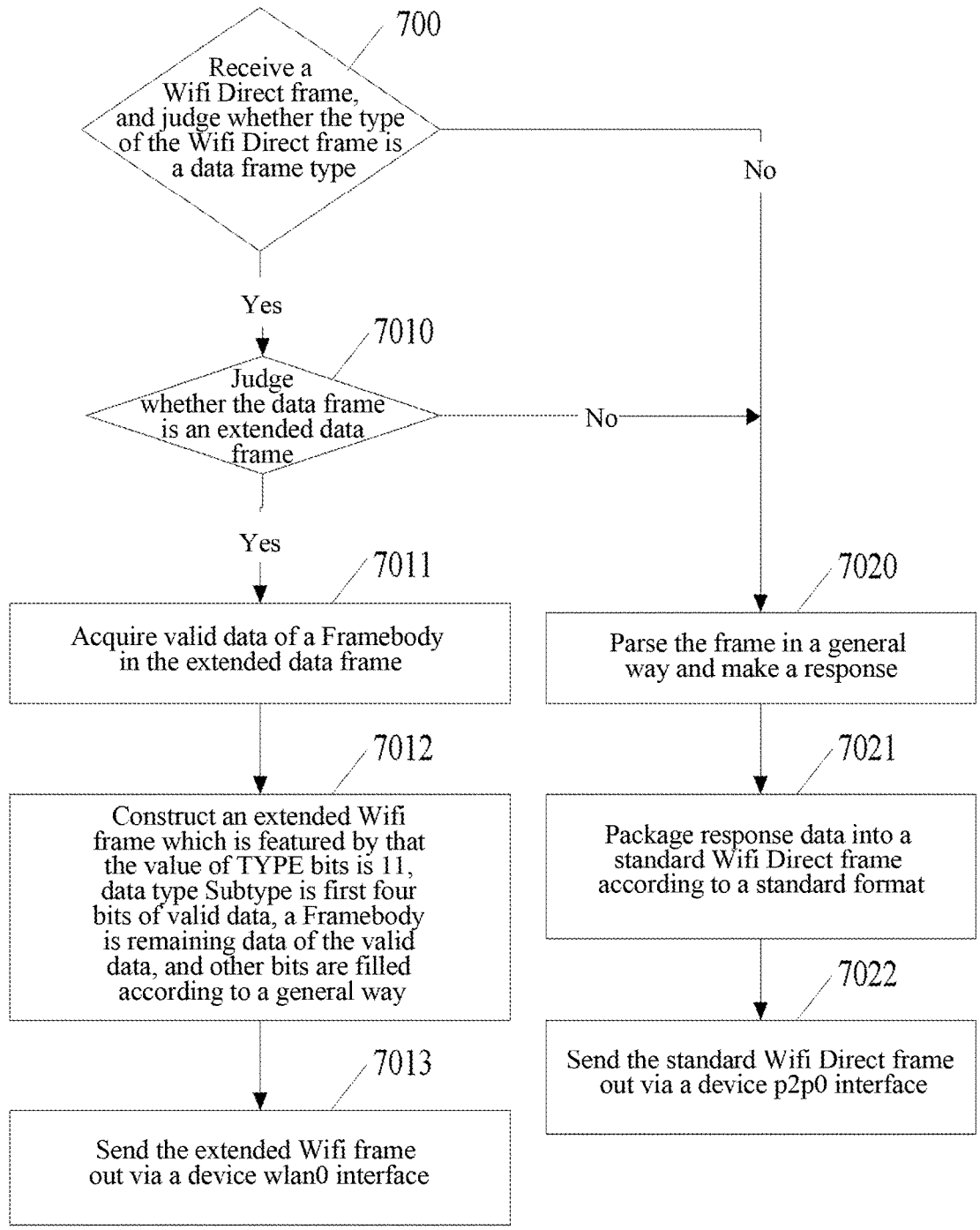
FIG. 7 is a flowchart of a method for realizing network access via Wi-Fi® provided by embodiment 2 of the present document.

FIG. 7 is a flowchart of a method for realizing network access via Wi-Fi® provided by embodiment 2 of the present document. As shown in FIG. 7, since in embodiment 1 the access terminal constructs the extended data frame to distinguish from the data frame interacted between the access terminal and the intermediate terminal in the Wi-Fi Direct® mode, when the intermediate terminal receives communication data, the method for realizing network access via Wi-Fi® includes:

In step 700, the intermediate terminal receives a Wi-Fi Direct® frame, and judges whether the Wi-Fi Direct® frame is a data frame. If so, step 7010 is executed; and otherwise, step 7020 is executed.

It needs to be stated that both the data frame and the extended data frame generated in embodiment 1 are Wi-Fi Direct® frames, i.e., data frames which are sent by and between terminals are certainly Wi-Fi Direct® frames according to standard communication protocols during communication in the Wi-Fi Direct® mode.

In step 7010, it is to judge whether the data frame is an extended data frame. If so, step 7011 is executed; and otherwise, also step 7020 is executed.

In step 7011, valid data of a Framebody in the extended data frame are acquired.

In step 7012, an extended Wi-Fi® frame is constructed, which is featured by that the value of Type bits is 11, a data type Subtype is first four bits of valid data, a Framebody is remaining data of the valid data, and other bits are filled according to a general way.

It needs to be stated that the general way is a way for filling frames according to standard protocols.

In step 7013, the extended Wi-Fi® frame is sent out via a device wlan0 interface.

It needs to be stated that the extended Wi-Fi® frame is sent to the wireless router through the intermediate terminal, i.e., the extended Wi-Fi® frame constructed carries the valid data for accessing the network in frame information, realizing communication from the access terminal to the intermediate terminal to the wireless router.

If the acquired Wi-Fi Direct® frame is not the data frame or the data frame, but is not the extended data frame which is constructed by the access terminal in order to access the network, step 7020 is executed.

In step 7020, the frame is parsed in a general way and a response is made.

It needs to be stated that in step 7021, the response data are packaged into a standard Wi-Fi Direct® frame according to a standard format; and in step 7022, the standard Wi-Fi Direct® frame is sent out via a device p2p0 interface.

It needs to be stated that steps 7020-7022 are the method and steps of the related arts. The purposes of stating this part are just to more clearly describe the contents of the present document and to further state that the present document has no communication conflict with the related arts.

Embodiment 3

Figure 8:
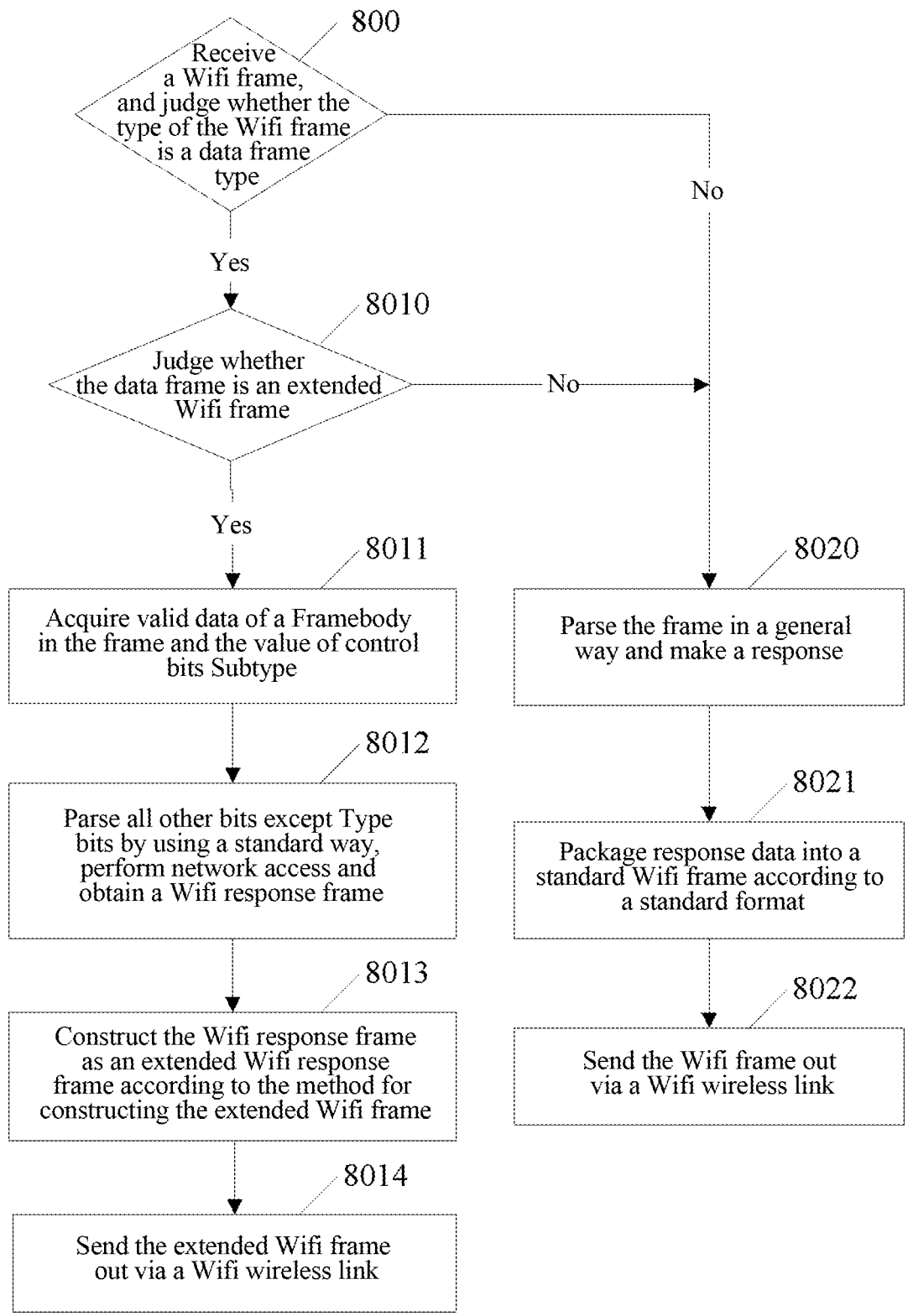
FIG. 8 is a flowchart of a method for realizing network access via Wi-Fi® provided by embodiment 3 of the present document.

FIG. 8 is a flowchart of a method for realizing network access via Wi-Fi® provided by embodiment 3 of the present document. As shown in FIG. 8, when a wireless router receives the data frame sent by an intermediate terminal, the method for realizing network access via Wi-Fi® includes:

In step 800, when receiving a Wi-Fi® frame, the wireless router judges whether the type of the Wi-Fi® frame is a data frame type. If the type of the Wi-Fi® frame is the data frame type, step 8010 is executed; and otherwise, step 8020 is executed.

In step 8010, it is to judge whether the data frame is an extended Wi-Fi® frame. If the data frame is the extended Wi-Fi® frame, step 8011 is executed; and otherwise, step 8020 is still executed.

In step 8011, valid data of a Framebody in the frame and a Subtype value of control bits are acquired.

In step 8012, all other bits except Type bits are parsed by using a standard way, and network access is performed and a Wi-Fi® response frame is obtained.

In step 8013, the Wi-Fi® response frame is constructed as an extended Wi-Fi® response frame according to a method of constructing the extended Wi-Fi® frame.

In step 8014, the extended Wi-Fi® frame is sent out via a Wi-Fi® wireless link.

It needs to be stated that the method of sending the extended Wi-Fi® frame out via the Wi-Fi® wireless link is the same as the way of sending a common Wi-Fi® frame.

If the Wi-Fi® frame received by the wireless router is not the data frame or the data frame, but is not the extended data frame, the following steps are executed according to the related arts.

In step 8020, the frame is parsed in a general way and a response is made.

In step 8021, response data are packaged into a standard Wi-Fi® frame according to a standard format.

In step 8022, the Wi-Fi® frame is sent out via a Wi-Fi® wireless link.

Embodiment 4

Figure 9:
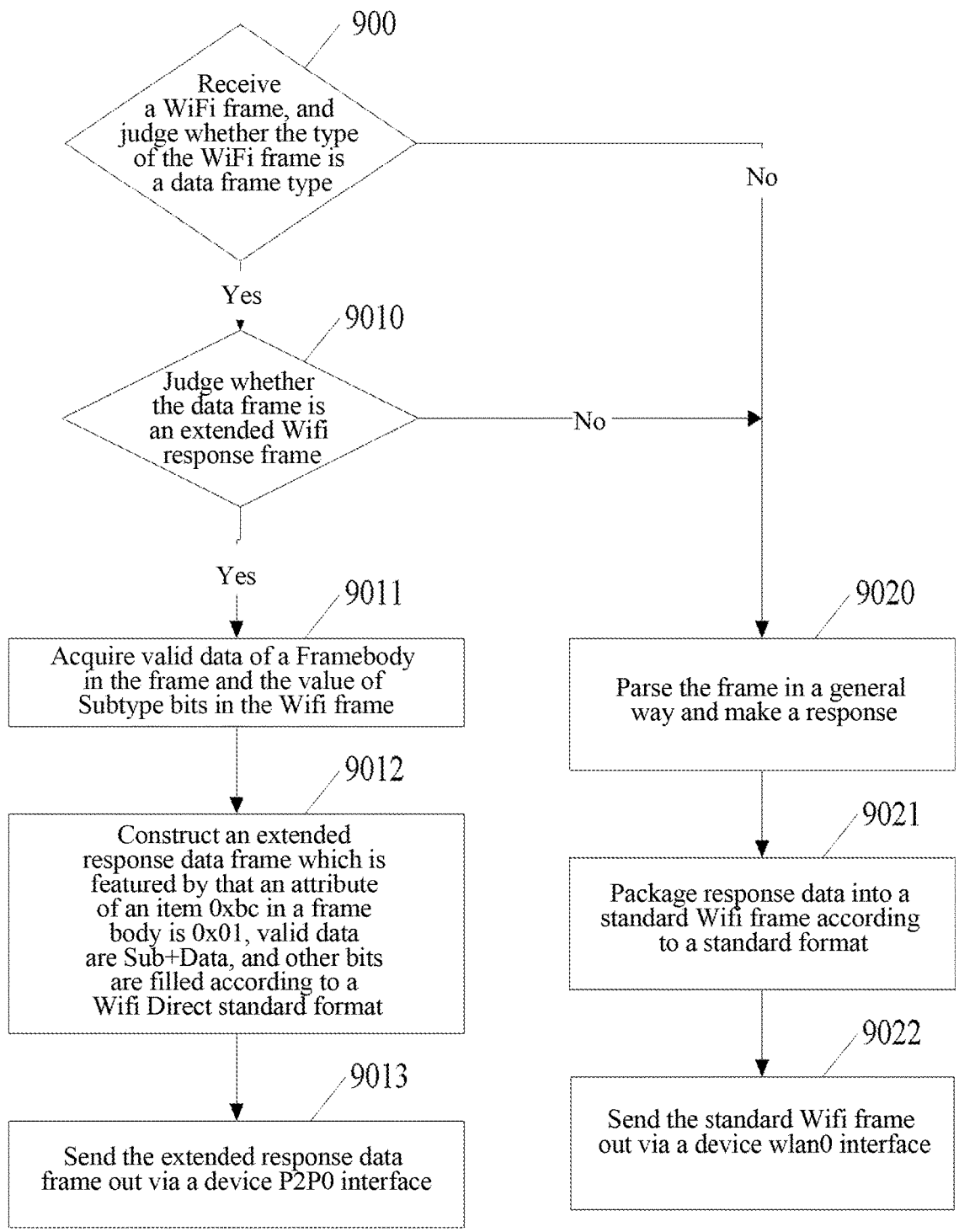
FIG. 9 is a flowchart of a method for realizing network access via Wi-Fi® provided by embodiment 4 of the present document.

FIG. 9 is a flowchart of a method for realizing network access via Wi-Fi® provided by embodiment 4 of the present document. As shown in FIG. 9, when a wireless router receives a data frame sent by an intermediate terminal, the method for realizing network access via Wi-Fi® includes:

In step 900, when receiving a Wi-Fi® frame, an access terminal judges whether the type of the Wi-Fi® frame is a data frame type. If the type of the Wi-Fi® frame is the data frame, step 9010 is executed; and otherwise, step 9020 is executed.

In step 9010, it is to judge whether the data frame is an extended Wi-Fi® response frame. If the data frame is the extended Wi-Fi® response frame, step 9011 is executed; and otherwise, step 9020 is still executed.

In step 9011, valid data of a Framebody in the frame and a Subtype value of control bits are acquired.

In step 9012, an extended response data frame is constructed, which is featured by that an attribute of an item 0xbc in a Framebody is 0x01, valid data are Sub+Data, and other bits are filled according to a Wi-Fi Direct® standard format.

In step 9013, the extended response data frame is sent out via a device P2P0 interface.

It needs to be stated, after the extended response data frame is sent out via the P2P0 interface and the extended response data frame is received and parsed by the access terminal, the purpose of realizing network access via the intermediate terminal is achieved.

In step 9020, the frame is parsed in a general method and a response is made.

In step 9021, response data are packaged into a standard Wi-Fi® frame according to a standard format.

In step 9022, the standard Wi-Fi® frame is sent out via a device wlan0 interface.

Although the embodiments disclosed by the present application are described above, the described contents are embodiments just used for conveniently understanding the present application and instead of limiting the present application. One skilled in the art of the present application can make any modification and variation to the implementation modes and details without departing from the rule and range disclosed by the present application. However, the patent protection range of the present application shall be still subjected to the range defined by the annexed claims.

INDUSTRIAL APPLICABILITY

In the embodiments of the present document, by constructing the extended Wi-Fi® frame and the extended data frame, data of the access terminal which is unable to access a Wi-Fi® network are sent to the wireless router through the intermediate terminal, the occurrence of the situation that a Wi-Fi® terminal cannot join in a local area network to access the network via the wireless router is avoided, thereby improving the validity of network access. Therefore, the present application has very great industrial applicability.

What is claimed is:

1. A method for realizing network access via an IEEE 802.11 series protocol (Wi-Fi), comprising:
enabling, by both an access terminal and an intermediate terminal, a Wi-Fi Station mode and a peer-to-peer IEEE 802.11 series protocol (Wi-Fi Direct) mode thereof respectively, wherein the intermediate terminal communicates with the access terminal in the Wi-Fi Direct mode and communicates with a wireless router in the Wi-Fi Station mode to access a network;
when the access terminal cannot connect to the wireless router directly by sending a network access command CMD_ONLINE in the Wi-Fi Station mode, constructing, by the access terminal, an extended data frame in the Wi-Fi Direct mode, and sending the extended data frame to the intermediate terminal, wherein the extended data frame carries valid data for accessing the network;
when receiving the extended data frame in the Wi-Fi Direct mode, extracting, by the intermediate terminal, the valid data for accessing the network, and determining that the extended data frame is used for accessing the network but not for directly interacting between the access terminal and the intermediate terminal according to the valid data;

carrying, by the intermediate terminal, the extracted valid data in an extended Wi-Fi frame in the Wi-Fi Station mode, and sending the extended Wi-Fi frame to the wireless router;

parsing, by the wireless router, the extended Wi-Fi frame, sending the valid data obtained through parsing to the network, and obtaining response data from the network;

carrying, by the wireless router, the obtained response data in an extended Wi-Fi response frame, and feeding the extended Wi-Fi response frame back to the intermediate terminal; and after constructing the extended Wi-Fi response Frame as an extended response data frame, feeding, by the intermediate terminal, the extended response data frame back to the access terminal, and the access terminal parsing the extended response data Frame to complete network access;

wherein the extended data frame in the Wi-Fi Direct mode is featured by that an attribute of an item 0xbc in a Framebody is 0x01; and the valid data are data Sub and CMD_ONLINE, and other bits except the data Sub and CMD_ONLINE are filled according to a Wi-Fi Direct standard format.

2. The method for realizing network access via Wi-Fi according to claim 1, wherein the step of carrying, by the intermediate terminal, the extracted valid data in the extended Wi-Fi frame in the Wi-Fi® Station mode comprises:

constructing, by the intermediate terminal, the extended Wi-Fi frame in the Wi-Fi Station mode; wherein, in the extended Wi-Fir frame, a TYPE value of a frame type in Frame Control is 11, a data type Subtype is first Four bits of the valid data, a Framebody is remaining data of the valid data, and other data except the Frame Control, the data type Subtype and the Framebody are filled according to protocols.

3. A system for realizing network access via an IEEE 802.11 series protocol (Wi-Fi), comprising a wireless router, at least one access terminal and at least one intermediate terminal, wherein both the access terminal and the intermediate terminal are in a Wi-Fi Station mode and a peer-to-peer IEEE 802.11 series protocol (Wi-Fi Direct) mode, and the intermediate terminal communicates with the access terminals in the Wi-Fi Direct mode and communicates with a wireless router in the Wi-Fi Station mode to access a network; wherein the access terminal is configured to, when the access terminal cannot connect to the wireless router directly by sending a network access command CMD_ONLINE in the Wi-Fi Station mode, construct an extended data frame in the Wi-Fi Direct mode, and send the extended data frame to the intermediate terminal, wherein the extended data frame carries valid data for accessing the network;

the intermediate terminal is configured to, when receiving the extended data frame in the Wi-Fi Direct mode, extract the valid data for accessing the network, determine that the extended data frame is used for accessing the network but not for directly interacting between the access terminal and the intermediate terminal according to the valid data; and carry the extracted valid data in an extended Wi-Fi frame in the Wi-Fi Station mode, and send the extended Wi-Fi frame to the wireless router;

the wireless router is configured to parse the extended Wi-Fi frame, send the valid data obtained through parsing to the network, and obtain response data from the network; and carry the obtained response data in an extended Wi-Fi response frame, and feed the extended Wi-Fi response frame back to the intermediate terminal;

the intermediate terminal is further configured to, after constructing the extended Wi-Fi response frame as an extended response data frame, feed the extended response data frame back to the access terminal; and the access terminal is further configured to receive the extended response data frame sent by the intermediate terminal, and parse the extended response data frame to complete network access;

wherein the extended data frame in the Wi-Fi Direct mode is featured by that an attribute of an item 0xbc in a Framebody is 0x01; and the valid data are data Sub and CMD_ONLINE, and other bits except the data Sub and CMD_ONLINE are filled according to a Wi-Fi Direct standard format.

4. The system for realizing network access via Wi-Fi according to claim 3, wherein the intermediate terminal is configured to carry the extracted valid data in the extended Wi-Fi frame in the Wi-Fi Station mode by the following way:

the intermediate terminal constructing the extended Wi-Fi frame in the Wi-Fi Station mode; wherein, in the extended Wi-Fi frame, a TYPE value of a frame type in Frame Control is 11, a data type Subtype is first Four bits of the valid data, a Framebody is remaining data of the valid data, and other data except the Frame Control, the data type Subtype and the Framebody are filled according to protocols.

* * * * *